July 23, 1946.    A. W. RANDALL    2,404,655
MACHINE FOR FELLING TREES
Filed March 4, 1944    3 Sheets-Sheet 3

Arthur W. Randall
Inventor

By Francis V. McCarthy
Attorney

Patented July 23, 1946

2,404,655

UNITED STATES PATENT OFFICE 2,404,655

MACHINE FOR FELLING TREES

Arthur W. Randall, Saugus, Mass.

Application March 4, 1944, Serial No. 525,076

1 Claim. (Cl. 143—43)

This application for a patent pertains to improvements in methods of felling standing trees and cutting them into logs.

Among the advantages resulting from the use of my invention are: A tree having a trunk of any diameter can be felled and cut into logs of any desired length, the felling and logging being done with a single machine and in much less time than heretofore. In the felling process, the tree is compelled by my apparatus to fall in any predetermined direction. While the felling cut is being made in the tree trunk, constant pressure is being exerted on the tree, which keeps the saw-cut open, thus preventing the tree from pinching the blade and interfering with the cutting, and when the cut has been made, this pressure directs the fall of the tree. When the tree has been felled, the limbs are cut from the tree trunk and the limbs and trunk cut into logs by the logging saw, as will be described hereinafter. The felling and logging being done by a single machine in successive operations, my method results in great saving of time and labor. It also makes safe a usually dangerous kind of work because the tree is compelled to fall in the desired position. Other advantages will be understood by those familiar with and those skilled in the work to which the method applies.

Two saws are provided and these are operated by a single power unit, one of the saws being positioned in a horizontal plane for felling trees and the other saw in a vertical plane for cutting the limbs and tree trunk into logs ready for the mill or for stacking. The saws are driven by power transmitted from the engine of a tractor, or other motor vehicle, as will be fully described in this specification. The entire equipment is mounted on the motor vehicle, is moved into position and during the cutting operations is adjusted and maintained in proper cutting positions thereby.

In the drawings that accompany this application for a patent as a part thereof—

Figure 1:
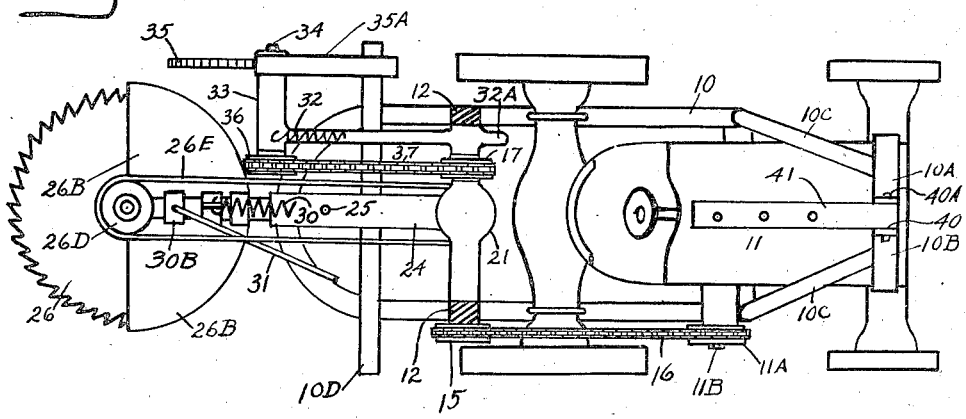
Figure 1 shows a plan view of the sawing equipment mounted on a tractor, with the removable pressure pole and the removable rack not shown and with posts 12 broken off.

Referring to the drawings, I provide a strong frame 10 which may be removably or permanently attached to tractor 11. At one end of the frame are posts 10A and 10B and braces 10C to support the pressure pole which will be described hereinafter; also a cross-bar 10D and vertical posts 12. This frame extends along the entire length of the tractor.

Figure 2:
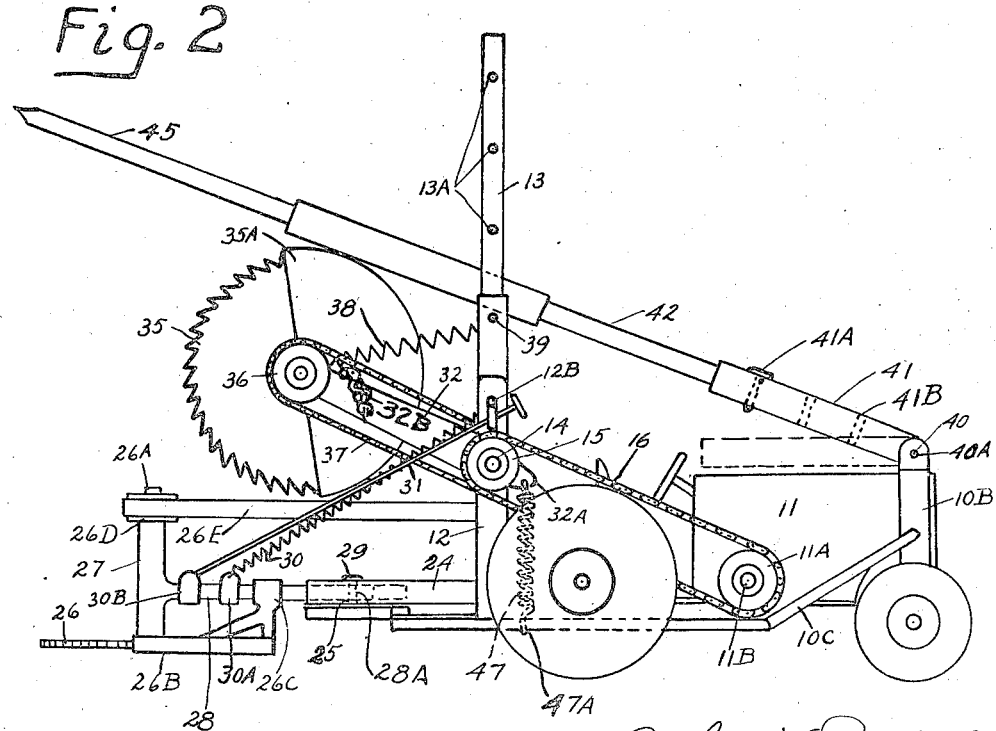
Figure 2 is a side view, with the parts not shown in Figure 1 added.
Figure 3:
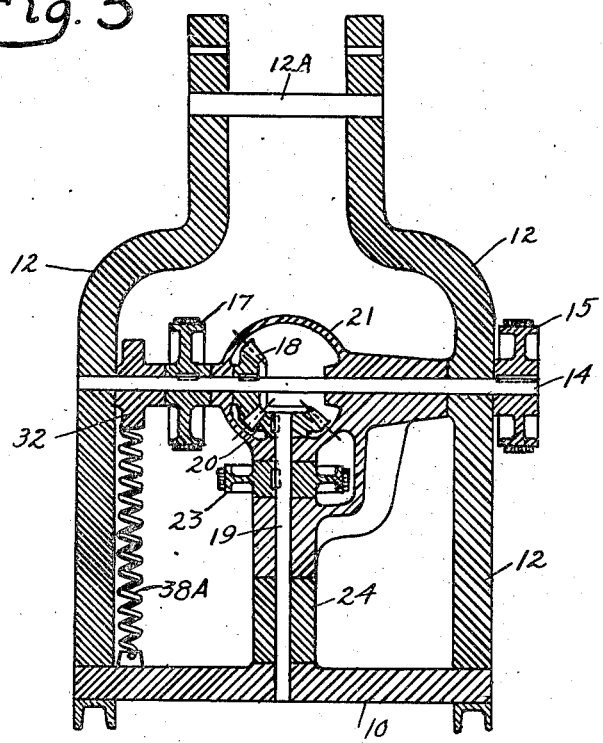
Figure 3 is a sectional view showing the power transmission assembly.
Figure 5:
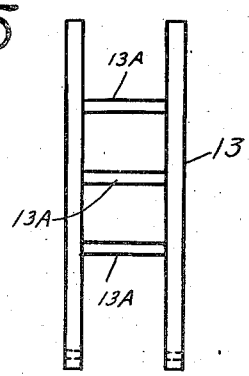
Figure 5 is a detail illustrating the removable rack.

The sawing equipment hereinafter described is positioned on frame 10 and extends beyond one end of the tractor, as shown in Figures 1 and 2. 11A is a power take-off pulley mounted on a shaft 11B which is operatively connected with the engine of the tractor. Between posts 12 are cross-bars 12A (Fig. 3) and on one of the posts is a bracket 12B. 13 is a detachable rack which forms a vertical projection of posts 12 when in position thereon and has cross-bars 13A thereon. See Fig. 5. A horizontal shaft 14 is mounted in posts 12. Affixed to shaft 14 is a pulley 15 positioned to be operatively connected with the power take-off pulley 11A by a friction belt 16. Also attached to shaft 14 is another pulley 17, positioned to transmit power to the logging saw, as will be described hereinafter.

Attached to shaft 14 and positioned between pulleys 15 and 17 is a bevel gear 18 within a gear case 21. See Fig. 3. Mounted in the gear case is a vertical spindle 19 and mounted on the spindle in mesh with gear 18 is a bevel gear 20. 23 is a pulley attached to spindle 19 and the spindle passes through and thus pivotally mounts a hollow horizontal arm 24. 25 is a bolt hole passing through arm 24. 26 is the felling saw mounted on a vertical spindle 26A and having a protecting jacket 26B. 27 is a sleeve supporting spindle 26A and carrying a horizontal arm 28, the latter having a bolt hole 28A passing therethrough, this arm being adapted to be removably mounted in arm 24 by inserting the free end of arm 28 therein until bolt holes 25 and 28A are in position to have inserted therein the bolt 29. 30 is a tension spring attached to collar 30A on arm 28 and removably attached to crossbar 12A. 31 is a guiding bar attached to collar 30B on sleeve 28 and when inactive rests in bracket 12B on post 12. The saw protective jacket 26B is attached to arm 28 by collar 26C on arm 28. 26D is a pulley mounted on spindle 26A and adapted to be operatively connected with pulley 23 by friction belt 26E.

Pivotally mounted on shaft 14, but not revolvable therewith, is an arm 32 attached to which is a sleeve 33 in which is mounted the logging saw spindle 34 to which are attached the logging saw 35 and pulley 36, the pulley being adapted to be operatively connected with pulley 17 on shaft 14 by friction belt 37. 38 is a tension spring attached to sleeve arm 32 and removably attachable to cross-arm 12A. 32B is a chain attached to arm 32 (shown broken off in Figure 2). Extending from logging saw arm 32 is a short arm 32A to which is attached a heavy compression spring 47 which is also attached to frame 10, as at 47A in Figure 2.

Figure 4:
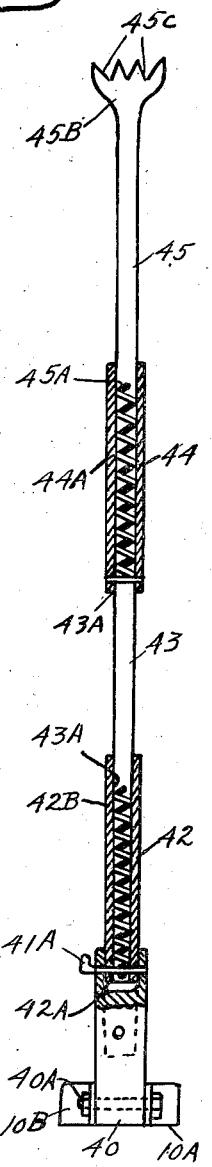
Figure 4 is a detail illustrating the construction of the pressure pole.

Pivoted at 40 between the ends of posts 10A and 10B of frame 10 so as to move freely in a vertical angle and also at slight lateral angles is a socket pipe 41, being held in position by a bolt 40A passing through bolt holes 40 in the posts and pipe. Bolt holes 41A are also provided in pipe 41. Adapted to be removably positioned in socket pipe 41 is a pole including a plurality of sections that will be understood if described as follows (it being also understood that I do not mean to limit myself to the number of sections or their relative positions in the unit): As shown in Figure 4, a pipe 42, adapted to be inserted in pipe 41, has bolt holes 42A corresponding in size with bolt holes 41B and is held in position by a bolt 41A passing through any of the holes in pipes 41 and 42 to hold the two pipes in locked position with relation to each other. Within pipe 42 is a heavy compression spring 42B. See Fig. 4. The diameter of the next section 43 is smaller than that of pipe 42. On each end of pipe 43 is a cap 43A to assist in making contacts with spring 42A and a similar spring 44A in the next section 44. Section 44 is similar in section to section 42. Section 45 is similar in section to pipe 43 and has a cap 45A at one end which enters pipe 44. On the other end of this section is a tree gripping element comprising a flat, slightly concave piece 45B which spreads laterally and has prongs 45C extending therefrom, thus providing means to grip a tree. The parts 42, 43, 44 and 45 are normally attached to each other and form a removable unit. When mounted in socket pipe 41 by means of bolt 41A the pole rests on any one of cross-bars 13A and in this position the grip 45B extends far enough beyond the cutting edge of felling saw 26 to permit compression of springs 42B and 44A by engagement of the grip with the tree before the felling operation is started.

When the tractor and equipment have arrived at the forest or wherever the work of felling and sawing is to be done, the rack 13 is attached to posts 12—12 by bolts, the pressure pole is passed through the rack to rest on one of cross-bars 13A, the cross-bar used for this purpose depending upon the height and size of the tree, and pipe 42 is locked in socket pipe 41 by bolt 41A.

When idle, the logging saw 35 is in an elevated inactive position so as not to interfere with the felling operation, as shown in Figure 2; and when in operative position arm 32, which carries the logging saw is horizontally disposed. The weight of the logging saw is counterbalanced by the tension springs 47 and 38. To place the logging saw in inactive position it is drawn up by chain 32B which is then fastened to one of the cross-bars on the rack 13 and this chain is released when it is desired to lower the saw to active position. When the logging saw is in the inactive position friction belt 37 is slipped from pulley 17 so that no power is transmitted to the logging saw during the felling operation.

When the tractor is moved up to position the felling saw at the tree that is to be felled, grip 45B makes contact with the tree by means of prongs 45C and as the tractor advances this contact compresses springs 42B and 44A. The guiding bar 31 is then used to move the felling saw equipment laterally to position the saw properly for cutting into the tree trunk and to control the action of the saw during the cutting operation, the cut being made across and into the trunk as the felling operation progresses.

During the felling operation, power is transmitted to the felling saw from the tractor engine through the power take-off shaft 11B, pulley 11A, belt 16, pulley 15, shaft 14, gears 18 and 20, spindle 19, pulley 23, belt 26E and pulley 26D to felling saw spindle 26A and saw 26.

As stated, the pressure pole engages the tree and exerts pressure thereon before the felling saw starts cutting. This pressure causes the pipes 43 and 45 to telescope pipes 42 and 44 and the spring compressions resulting therefrom build up power in the springs. This power pressure reacts on the tree while it is being cut into to prevent the tree from leaning towards the saw and closing the saw-cut; and as the cutting progresses this pressure also forces that part of the tree that is above the cut away from the apparatus. When the tree has been cut through, or deeply enough, this pressure topples the tree in the desired direction.

When the tree has been felled, belt 26E is removed from the felling saw pulley 26D, bolt 29 is withdrawn and the felling unit removed.

During the felling operation, the logging saw is in the inactive position already described. The logging is done as follows: After the felling equipment has been removed, chain 32B is released from the cross-bar to which it has been attached and the logging saw lowered into operative position with belt 37 operatively connecting pulleys 17 and 36. Transmission of power to shaft 14 has already been described and this power is transmitted from shaft 14 to the logging saw by pulleys 17 and 36 and belt 37 and the logging saw spindle 34. The small branches having been removed from the tree, the tractor moves along the fallen tree trunk and cuts the limbs from the trunk. After the limbs have been cut off, the trunk and limbs are cut into logs by the logging saw.

It will be understood that all parts where friction or pressure is likely to exist in the power system, as between the spindle sleeves and spindles, for example, and elsewhere, Timkin or other bearings are used, so that the entire action is free and smooth.

Figure 6:
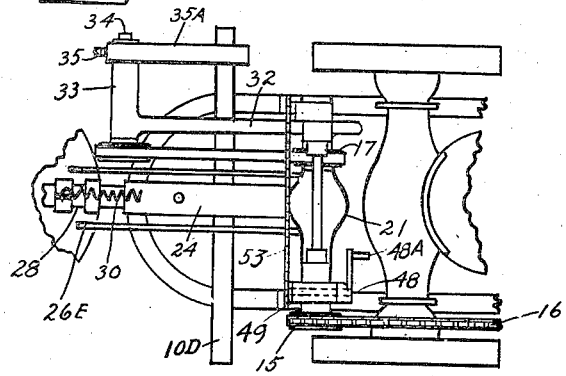
Figures 6, 7 and 8 are details of other means than the adjustment rod shown in Figure 2 for moving the felling saw laterally.
Figure 8:
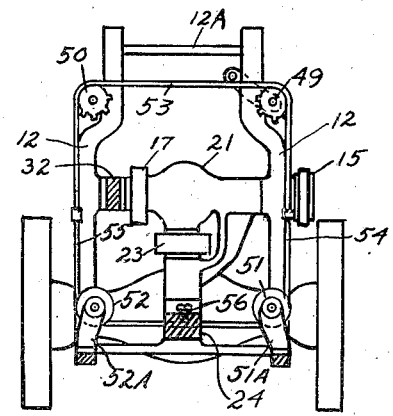
Figure 7:
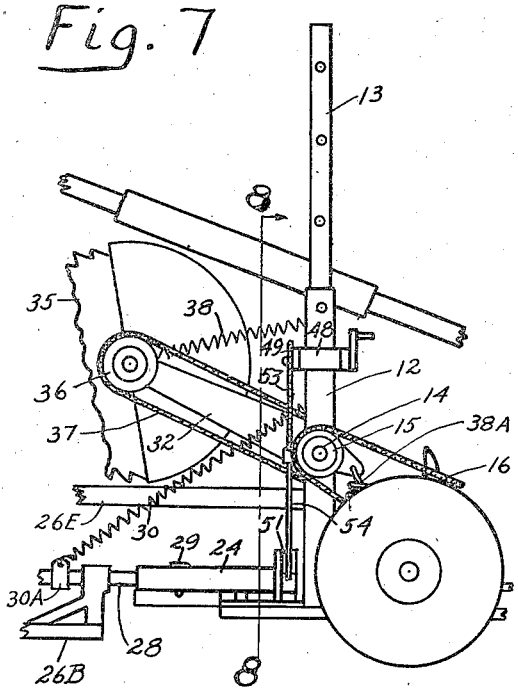

As an alternative means for moving the felling saw laterally with the guiding rod 31, I show in Figures 6, 7 and 8 a method by which this operation is performed by the operator while seated on the tractor. A shaft 48 with a handle 48A, and mounted on a post 12, carries a sprocket wheel 49. A second sprocket wheel 50 is revolvably mounted on the other post 12. Pulleys 51 and 52 are mounted in bearings 51A and 52A on frame 10. Passing over the sprocket wheels is a sprocket chain 53 which is connected at each end with a belt 54 or 55. Each of these belts passes through one of the pulleys and the free end of each belt is attached to the felling saw arm 24 as at 56 in Figure 8. The sprocket wheels and pulleys are in the same vertical plane; and the pulleys are in the same horizontal plane as saw arm 24. By means of this arrangement the operator can, by turning handle 48A, cause the felling saw to move laterally to right or left as desired.

Applicant desires that it be understood that the description of his apparatus in this specification, while it shows the essential features of his invention, does not show refinements that can be added, as, for example, means for moving the felling saw out of active position without removing it from the assembly, means for raising the logging saw out of active position by other means than the chain referred to above, an extensible rack 13 that could be raised or lowered without removal, etc. Such changes and others that applicant has in mind as applicable would not add to the felling and logging efficiency of the present device, which does its work in an extremely satisfactory manner.

Having described my invention and its mode of operation, what I claim is:

In a device of the class described including a circular saw operatively positioned on a motor vehicle by means of a pivoted horizontal arm mounted on a frame attached to the vehicle, the saw being adapted to cut down standing trees, means for moving the saw laterally in a horizontal arc, said means comprising a shaft mounted on the frame, a handle on the shaft, a sprocket wheel mounted on the shaft, a second sprocket wheel and pulleys mounted on the frame, the sprocket wheels and pulleys being in the same vertical plane, a sprocket chain mounted on the sprocket wheels, a belt attached to each end of the chain, passing through the pulleys and connected with said arm, the whole being adapted to move the saw laterally in a horizontal arc on the pivoted arm by turning the handle manually, as described.

ARTHUR W. RANDALL.